United States Patent [19]

Lambregts

[11] 4,141,522
[45] Feb. 27, 1979

[54] INDEPENDENT GLIDE SLOPE GAIN PROGRAMMING SYSTEM

[75] Inventor: Antonius A. Lambregts, Renton, Wash.

[73] Assignee: Boeing Commercial Airplane Company, Seattle, Wash.

[21] Appl. No.: 797,161

[22] Filed: May 16, 1977

[51] Int. Cl.² ............................................. G05D 1/12
[52] U.S. Cl. ...................................... 244/186; 364/429
[58] Field of Search ................. 235/150, 22; 244/183, 244/185, 186, 187; 318/583; 343/108 R; 364/428, 429

[56] References Cited

U.S. PATENT DOCUMENTS

| | | | |
|---|---|---|---|
| 3,295,796 | 1/1967 | Gaylor | 244/187 |
| 3,976,267 | 8/1976 | Meyer et al. | 244/186 |

Primary Examiner—Stephen G. Kunin
Attorney, Agent, or Firm—Bernard A. Donahue; Conrad O. Gardner

[57] ABSTRACT

A landing approach system for aircraft utilizing ILS (instrument landing system) beam guidance information which converts angular glide slope information into linear altitude deviation relative to the glide slope beam center, using computed range information.

8 Claims, 6 Drawing Figures

INDEPENDENT GLIDE SLOPE GAIN PROGRAMMING SYSTEM

SUMMARY OF THE INVENTION

The subject invention relates to a landing approach system for aircraft using ILS beam guidance information. The system disclosed converts angular glide slope information into linear altitude deviation relative to the glide slope beam center, using computed range information.

The aircraft range from the glide slope transmitter is computed in a closed loop circuit using rate of change of altitude, an assumed glide slope angle and derived glide slope rate of deviation. The initial range is computed from the rate of change of beam error, velocity and rate of change of altitude.

The resulting linear glide slope deviation signal is free from arbitrary sensitivity changes.

Systems of the prior art, employing radio altitude or time based glide slope gain programming, are adversely affected by terrain variations or timer set and reset characteristics.

BACKGROUND OF THE INVENTION

Early autopilot designs employed a time based gain programmer to convert the angular glide slope error signal into a near-linear deviation signal suitable for autopilot closed loop control. This technique assumes a fixed altitude (1500 ft.) for starting the timer, a constant predetermined groundspeed and a predetermined glide slope angle. With such a system capture gains are selected for 1500 ft. altitude and are less than optimum for other altitudes. Groundspeed variations as well as glide slope angles different than those assumed also cause less than optimum gain, particularly at the end of the timer run. To improve gain control at the lower portion of the final approach the timer is reset at the middle marker.

Such system designs not only can produce a 2:1 gain variation at identical locations on the glide slope depending on glide slope angle and approach speed, but also allow for a 2:1 gain jump at the middle marker, potentially causing a control surface transient, as may be further understood from FIGS. 1, 2 and 3, showing the effect of two different airport approach conditions on a time base programmer output as a function of altitude.

Second generation autopilot designs employ radio altitude as a substitute measure for aircraft range from the glide slope transmitter. Here the assumption is that the approach terrain is relatively even and at the same elevation as the runway. Where this assumption is made, altitude above the terrain is taken as a representative measure for distance. In reality there are a number of airports with quite uneven approach terrain, particularly sharp terrain dips, and also approach terrain with a significant elevation difference relative to the runway. Such conditions produce less than optimum glide slope control gains.

Further, less than optimum glide slope control gains are produced as the result of the glide slope deviation itself, particularly at low altitudes, even for a perfectly smooth approach terrain. For example, a 20-ft. deviation under the glide slope at 100 ft. altitude produces a 20% gain deviation. A 20-ft. deviation at 100 feet may not be critical for making a successful landing, however, a more critical deviation at that altitude may render the glide slope control gains too low for recovery.

Accordingly, it is the object of this invention to provide an improved glide slope gain programming system which avoids the aforementioned problems associated with time based gain programming and radio altitude gain programming.

A further object of the invention is to provide a gain programmer which utilizes only the basic glide slope control and damping signals, readily available in a normal autopilot design, thereby avoiding the use and reliance on an additional costly information source such as a radio altimeter.

A third object of this invention is to provide a low cost high performance glide slope gain control device, making it attractive and economically feasible to design automatic glide slope control autopilots for general aviation type aircraft.

DESCRIPTION OF THE INVENTION

The relationship between ILS glide slope beam deviation of an aircraft and the actual linear displacement of the aircraft from the beam center is given by $$\Delta h_{GS} = \epsilon R \tag{1}$$

wherein
- $\Delta h_{GS}$ = linear displacement of aircraft from the beam center (feet)
- $\epsilon$ = angular glide slope deviation of aircraft from the beam center (radians)
- $R$ = aircraft range to the glide slope transmitter (feet)

Figure 1:
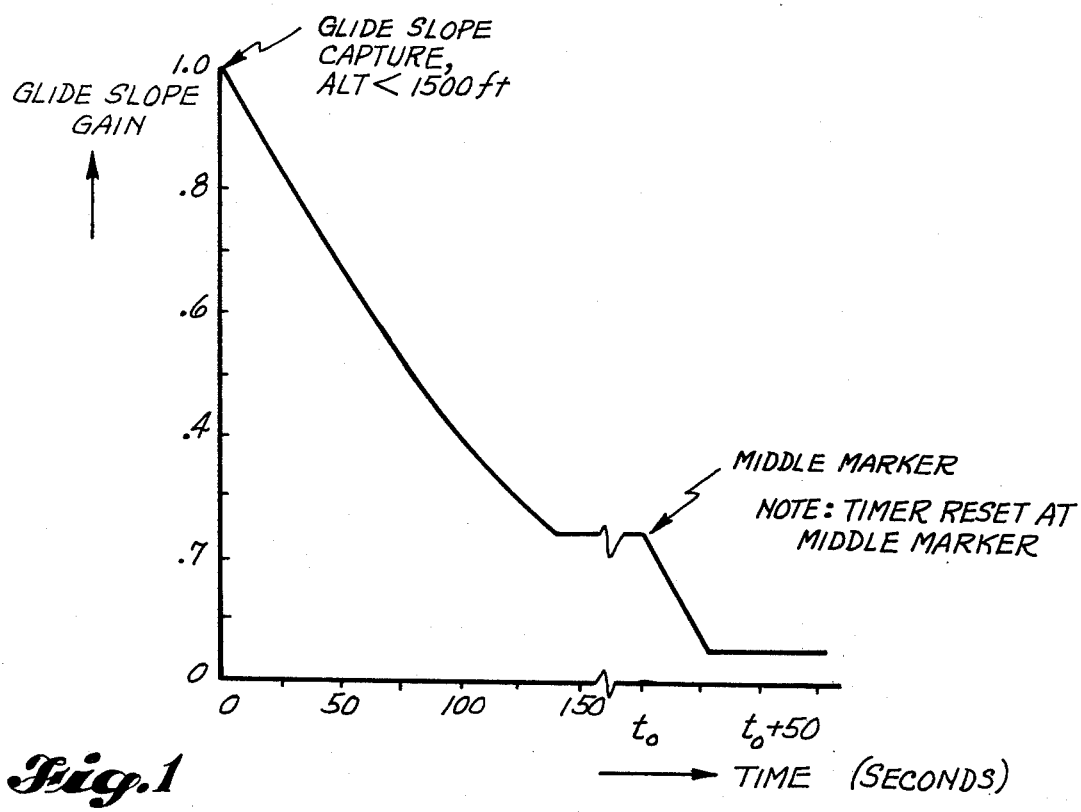
FIG. 1 is a graph illustrative of transient conditions present in prior art systems.
Figure 2:
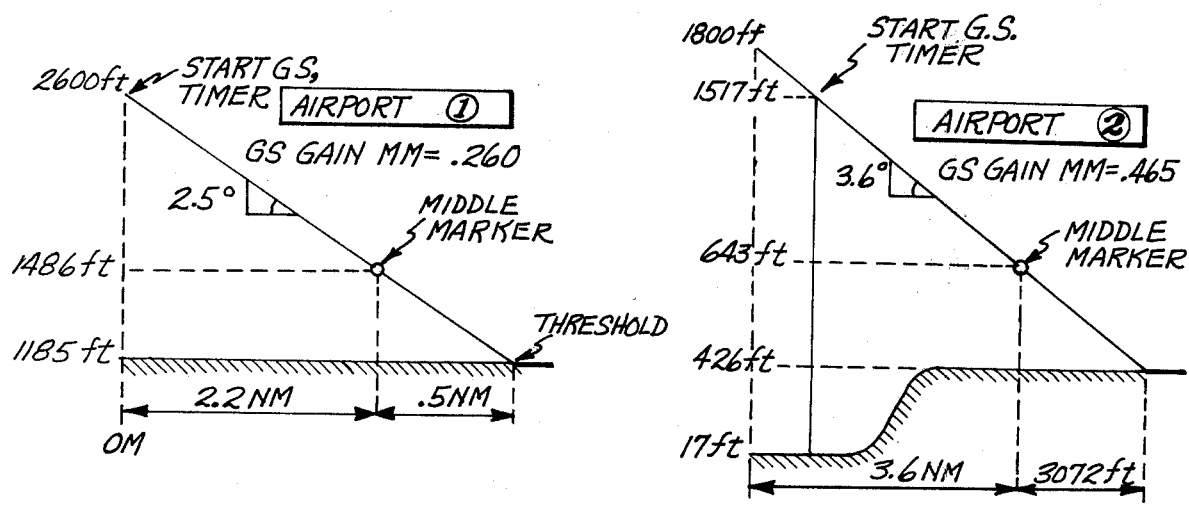
FIG. 2 in conjunction with FIG. 1 is illustrative of a first and second airport condition on the prior art time base programmer output as a function of altitude.
Figure 3:
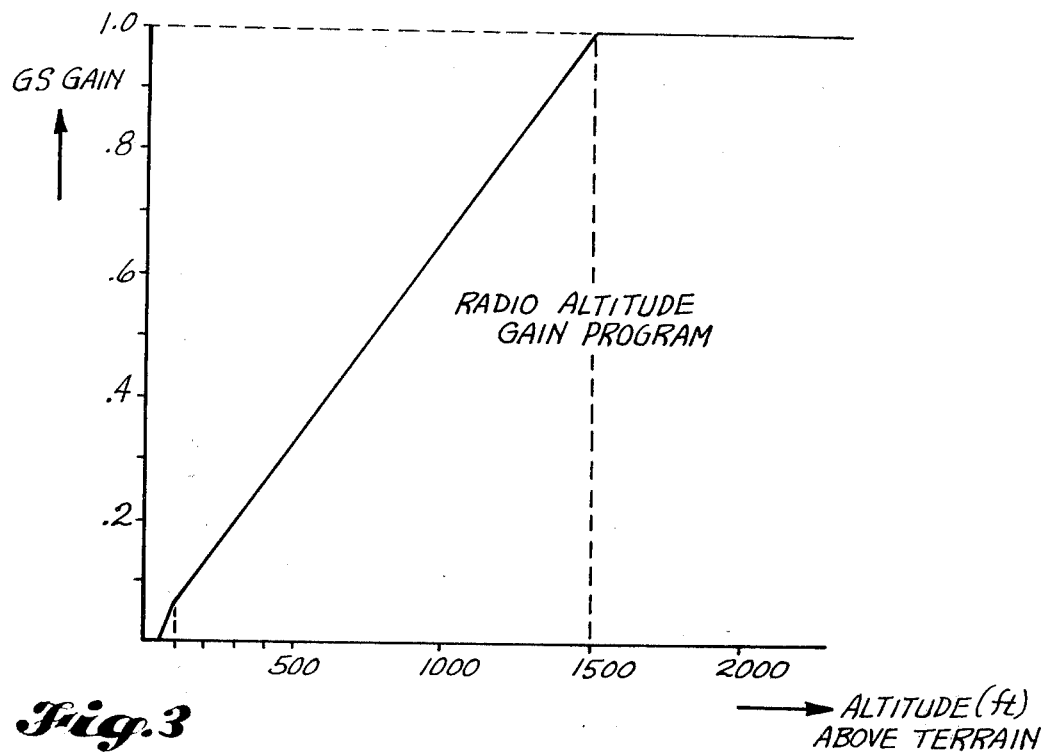
FIG. 3 is a plot of the radio altitude gain program of the present system.
Figure 4:
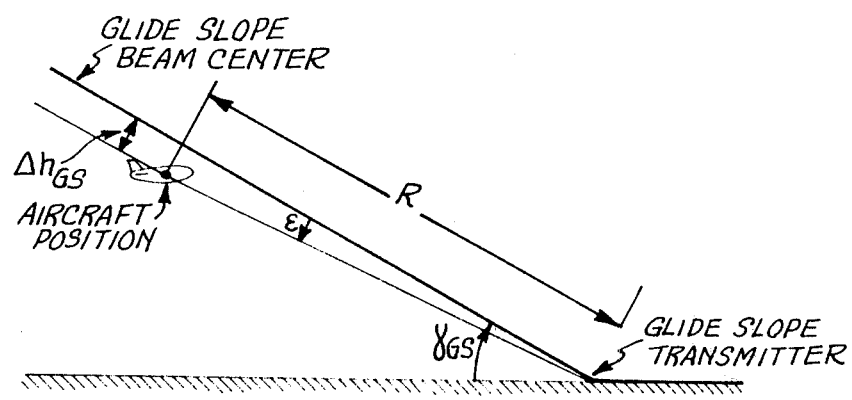
FIG. 4 is depictive of glide slope geometry deemed helpful in understanding the equations hereinafter developed relating to the present system.

The glide slope geometry depicting this relationship is given in FIG. 4. Using relationship (1) the rate of deviation from the beam center is obtained by differentiating:

$$\dot{h}_{GS} = R \frac{d\epsilon}{dt} + \epsilon \frac{dR}{dt} \tag{2}$$

It should be noted that in equation (2) (dR/dt) is approximately equal to the ground speed $V_G$. For typical glide slope capture conditions the term $\epsilon$ (dR/dt) is small compared to R (d$\epsilon$/dt), as may be illustrated by the following example: Assume a level approach at altitude h = 1500 ft. and a vertical speed $\dot{h}$ = −10 ft/sec on glide slope with $\gamma_{GS}$ = −2.75° after capture. The corresponding ground speed is $V_G$ = 208.4 ft/sec. Before capturing the glide slope, while flying level, the aircraft's rate of closure on the beam is $\dot{h}_{GS}$ = −$V_G$sin$\gamma_{GS}$ = +10 ft/sec. The aircraft's range from the glide slope transmitter at h = 1500 ft. on the glide slope is R = 31,264 ft. At glide slope capture the altitude deviation from the beam center is typically 100 ft.

Therefore $\epsilon = \Delta h_{GS}/R = -100/31{,}264 = -0.00320$ radians or 0.183°. Then it follows $\epsilon \cdot dR/dt \approx \epsilon \cdot V_G = -0.66$ and this is much smaller than $\dot{h}_{GS}$. Therefore $$\dot{h}_{GS} \approx R \cdot d\epsilon/dt \quad (3)$$

or $$R \approx \frac{\dot{h}_{GS}}{d\epsilon/dt} \quad (4)$$

Formula (4) shows that during the glide slope intercept phase a close estimate of the range R may be obtained from beam rate $d\epsilon/dt$ and the rate of closure on the glide slope $\dot{h}_{GS}$. The quantity $d\epsilon/dt$ may be obtained from $\epsilon$ by a rate-taking network having a transfer function of the form $S/(\tau S + 1)$. The rate of closure on the glide slope $\dot{h}_{GS}$ would be $\dot{h}_{GS} = -V_G \sin\gamma_{GS}$ for level capture of the beam. However, in case of descending captures of the beam this formula is invalid and its use to estimate the Range would lead to significant inaccuracies.

Figure 5:
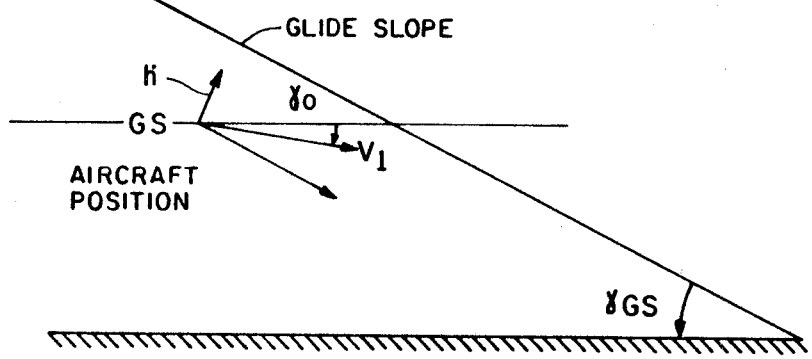
FIG. 5 is a diagram depicting a general glide slope intercept condition of the aircraft.

A more accurate measure for the rate of closure on the slide slope $\dot{h}_{GS}$ is obtained in the following way. In FIG. 5 a general glide slope intercept condition is depicted with the aircraft's inertial velocity $V_I$ and the aircraft's descent angle $\gamma_0$. The aircraft's descent rate relative to the earth is $\dot{h} = V_I \sin\gamma_0$ and $V_I \approx V_G$. Therefore $$\gamma_0 \approx \dot{h}/V_G \quad (5)$$

$$\dot{h}_{GS} = V_I \sin(\gamma_{GS} + \gamma_0) \quad (6)$$

Substitution of (5) into (6)

$$\dot{h}_{GS} = V_G \gamma_{GS} + \dot{h} \quad (7)$$

Substitution of (7) in (4) now yields $$R \approx \frac{V_G \gamma_{GS} + \dot{h}}{\frac{d\epsilon}{dt}} \quad (8)$$

A close estimate of R can now be made using formula (8) regardless of intercept angle with the glide slope beam. In formula (8) $\gamma_{GS}$ may be selected to be 2.75 degrees or 0.048 radians, causing a maximum range error of 10% for $\gamma_{GS} = 2.5°$ or $\gamma_{GS} = 3.0°$. Ground speed $V_G$ is not always available. In such a case true airspeed $V_T$ may have to be used, resulting in potential errors in R due to wind in the order of 10%.

The signals $\dot{h}$ and $d\epsilon/dt$ may be noisy and require filtering. Computation of R according to (8) may become impossible after the glide slope tracking mode has been established since $d\epsilon/dt$ goes to zero and also $(V_G\gamma_{GS} + \dot{h})$ goes to zero.

Formula (8) is therefore used only to establish an initial range estimate $R_0$.

$$R_0 = \frac{V_G \gamma_{GS} + \dot{h}}{\frac{d\epsilon}{dt}} \quad (9)$$

Figure 6:
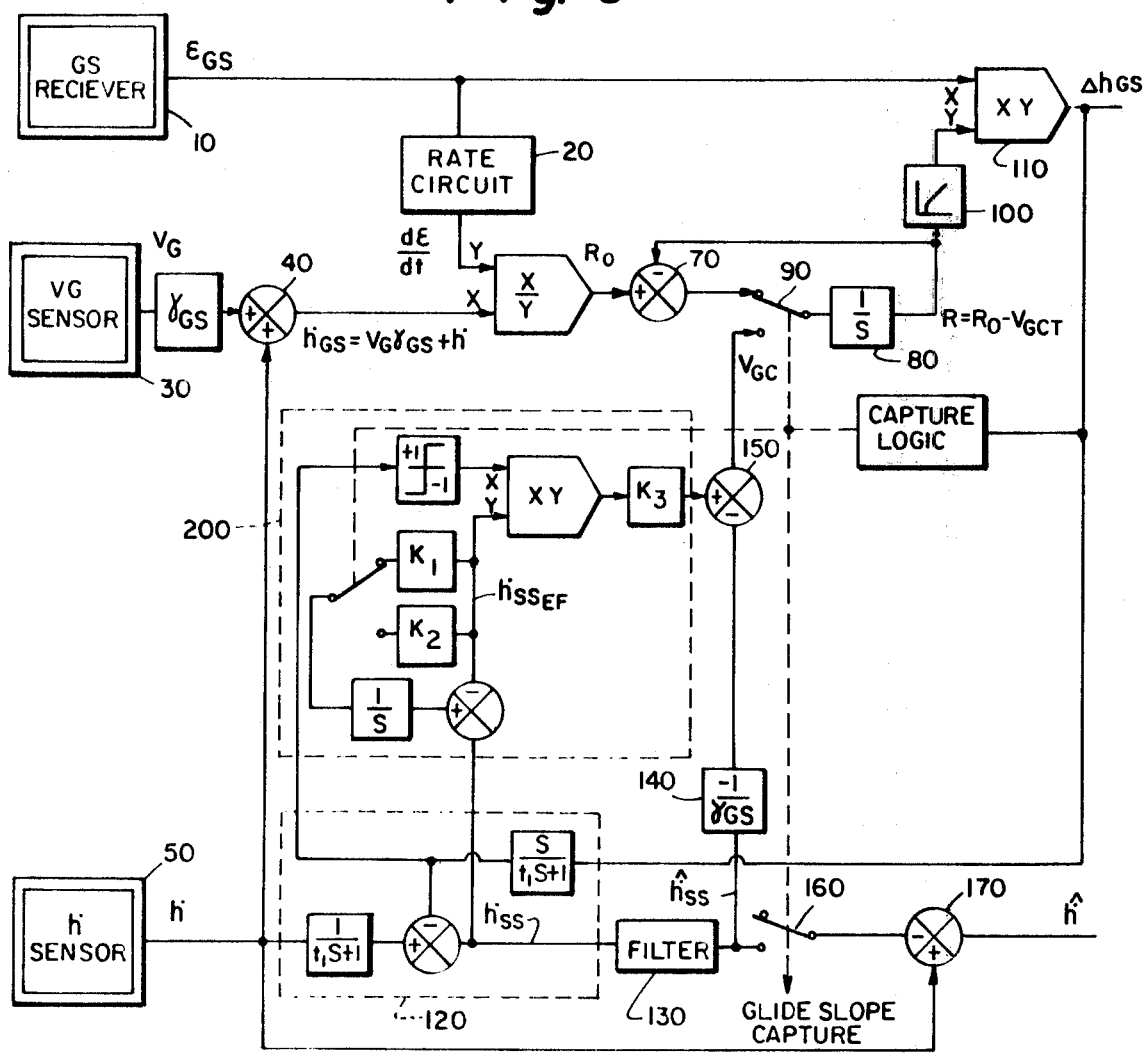
FIG. 6 is a system schematic embodiment of the present invention.

The implementation of the initial range calculation according to (9) is shown in FIG. 6. Herein is the beam error signal output from the glide slope receiver 10 processed in rate circuit 20 to produce a signal representative of $d\epsilon/dt$. The ground speed from ground speed sensing means 30 is amplified by a gain factor $\gamma_{GS}$ and added in adding means 40 to a signal representative of the rate of change of altitude of the aircraft from the rate of change of altitude sensing means 50. The output of adding means 40, representative of the signal $(V_G \cdot \gamma_{GS} + \dot{h})$ is divided in divider means 60 by the output signal from rate circuit means 20 representative of $d\epsilon/dt$ to produce at the output of divider means 60 the signal $$\frac{V_G \cdot \gamma_{GS} + \dot{h}}{\frac{d\epsilon}{dt}}$$

representative of the range $R_0$, during the glide slope capture maneuver. This initial range $R_0$ is memorized in a memory circuit consisting of adder means 70 and integrator means 80. The output of integrator 80 is coupled back to itself with negative gain through adder circuit 70 and switching means 90. With switch 90 closing the circuit loop around the integrator 80, the output in integrator 80 will track the output of the divider circuit 60 representative of the range estimate $R_0$.

As soon as a stable and reliable range estimate $R_0$ is obtained the input to the integrator may be switched over to a signal representative of the rate of change of range: the computed ground speed "$V_G$." From this point on, the range is updated by integrating the computed ground speed "$V_G$" in integrator 80 producing the computed range $R = R_0 - $"$V_G$" $\times$ t. A convenient switch-over from the initial range $R_0$ computation to the continuously updated range R computation is "glide slope capture," which occurs at a predetermined magnitude of the beam error.

The output of integrator 80 representative of the range R of the aircraft from the glide slope transmitter is further used in processing circuits 100 and 110 to produce the desired linearization of the glide slope beam error signal.

The angular beam error signal $\epsilon$ is unsuitable for direct use in an automatic glide slope control system because the true deviation of an aircraft from the glide slope beam $\Delta h_{GS}$ in feet is not only a function of the beam error $\epsilon$ but also a function of the range R:

$$\Delta h_{GS} = \epsilon R$$

With the range R continually computed $\Delta h_{GS}$ can now also be computed by multiplying $\epsilon$ and R as done in multiplier 110 of FIG. 6.

Processing means 100 may be employed to alter R in such a way as to program the beam deviation signal $\Delta h_{GS}$ from the output of multiplier 110 to zero at a range R where the airplane starts the flare maneuver.

The output of multiplier 110 $\Delta h_{GS}$ representative of the linear deviation of the aircraft from the beam center may now be used to stabilize the range computation, using a signal feedback technique.

For this purpose the rate of change of altitude signal $\dot{h}$ from rate of change of altitude sensing means 50 is correlated to the rate of change of deviation from the glide slope in correlation circuit 120. Circuit 120 produces at its output the difference between the lagged rate of change of altitude $\dot{h}/(\tau S + 1)$ and the lagged rate of change deviation from the glide slope beam $(\Delta h_{GS} S)/(\tau S + 1)$. This output, representative of $$\left(\frac{\dot{h}}{\tau S+1} - \frac{\Delta h_{GS} S}{\tau S+1}\right)$$

will be a steady state signal $\dot{h}_{SS}$ representative of the rate of change of altitude which is required to track the glide slope. Any variation in the rate of change of altitude indicates a perturbation of the glide slope tracking which will be reflected equally in the signal representative of the rate of change of glide slope deviation and the signal representative of the rate of change of altitude. The non-steady state components of these signals will therefore cancel out in the correlation circuit 120.

This output of correlation circuit 120, $\dot{h}_{SS}$, representative of the rate of change of altitude required for glide tracking, is representative of the ground speed since $$\dot{h}_{SS} = V_G TAN\gamma_{GS} \tag{10}$$

Therefore a measure for ground speed can be obtained from formula (10) using small angle approximation:

$$V_{GC} = (\dot{h}_{SS}/\gamma_{GS}) \quad , \tag{11}$$

Since the $\dot{h}$ signal from the rate of change of altitude sensing means 50 may be noisy, it may also be expected that the signal $\dot{h}_{SS}$ from the output of correlation circuit 120 is noisy. Before using it to produce $V_{GC}$ according to formula (11), this signal is therefore filtered in filtering circuit 130 producing at the output thereof the filtered signal $\dot{h}_{SS}$.

Formula (11) for computing ground speed requires knowledge of the glide slope angle $\gamma_{GS}$. It is conceivable that this information could be entered for every specific ILS glide slope installation the system would be used on. However, present glide slope angles vary between $-2.5°$ and $-3°$ and a fixed selecting of $\gamma_{GS} = -2.75°$ would therefore produce no more than a 10% error in the computation of the ground speed according to (11).

The signal output $\dot{h}_{SS}$ from filter circuit 130 is therefore amplified in amplifying circuit means 140 by a factor $-1/\gamma_{GS}$ whereby $\gamma_{GS} = -2.75°$ may be selected to produce at the output thereof a signal representative of the ground speed of the aircraft.

To the output signal from amplifying circuit 140, representative of the ground speed of the aircraft, is added a signal $K_3(\dot{h}_{SS})_{EF}$ from the range error feedback circuit 200, in adder circuit 150 to produce the compensated ground speed signal $-V_{GC}$.

This signal $-V_{GC}$ from the output of adding circuit 150 is now used to couple to the integrator 80 through switch 90 to update the range calculation after the glide slope beam has been captured. Accordingly, $$R = R_0 - \int_0^t V_{GC} dt$$

This range computation as provided in the embodiment of FIG. 6 and described above utilizing the glide slope deviation signal $\Delta h_{GS}$ and range error feedback for computation of the signal $V_{GC}$ representative of ground speed is self-correcting and converges to the correct range even if the initial range $R_0$ was in error. This feature can be shown as follows.

In the range error feedback circuit 200 the signal $\dot{h}_{SS}$ and the signal $\Delta h_{GS} S/(\tau_1 S+1)$ from the correlation circuit 120 are processed to determine the error in the range R. During the initialization of the range error computation $(\dot{h}_{SS})_{EF}$ is synchronized to zero using a small washout time constant $1/K_1$. After initialization, the signal $(\dot{h}_{SS})_{EF}$ is washed out with a long time constant $1/K_2$, only to ensure that bias errors on $\dot{h}_{SS}$ cannot adversely effect the long term range computation. If the range R is correct, the $\dot{h}_{SS}$ is constant, therefore $(\dot{h}_{SS})_{EF}$ is zero. The sign of the range error is determined by the sign of the signal $\Delta h_{GS} S/(\tau_1 S+1)$ from the correlation circuit 120 and the sign of the signal $(\dot{h}_{SS})_{EF}$ from the error feedback circuit 200. For example, if the signal $(\dot{h}_{SS})_{EF}$ from the error feedback circuit 200 has the same sign as the signal $\Delta h_{GS} S/(\tau_1 S+1)$ from the correlation circuit 120, the range R is too small and the error feedback circuit 200 will put out a positive signal proportional $(\dot{h}_{SS})_{EF}$, thereby reducing $V_{GC}$ and thus eliminating the range error. This comes about by multiplying the signal $(\dot{h}_{SS})_{EF}$ with the sign of the signal $\Delta h_{GS} S/(\tau_1 S+1)$. Vice versa, if the signal $(\dot{h}_{SS})_{EF}$ from the range error feedback circuit 200 is positive and the signal $\Delta h_{GS} S/(\tau_1 S+1)$ is negative, the range is too large and error feedback circuit 200 will put out a negative signal proportional to $(\dot{h}_{SS})_{EF}$, thereby increasing the signal $V_{GC}$ and thus eliminating the range error. The gain $K_3$ of the range error feedback circuit 200 is selected to allow sufficiently fast range correction to prevent initial range errors to cause unacceptable large errors toward the lower portion of the glide slope tracking, but small enough to prevent range perturbations due to glide slope multi-path signal distortion.

A further use of the signal $\dot{h}_{SS}$ representative of the filtered steady state rate of change of altitude of the aircraft during glide slope tracking is shown in adding circuit 170. Adding circuit 170 takes the signal $\dot{h}_{SS}$ from the output of the rate limited lag circuit 130 with a negative sign and adds it to the rate of change of altitude sensing means 50 to produce at the output thereof a signal $\dot{h}$ representative of rate of change of deviation from the glide slope. This signal becomes available after glide slope capture and may be used to damp the glide slope control mode.

Switches 90 and 160 are controlled by the capture logic circuit 180 which establishes a "glide slope capture logic discrete" based on the linear glide slope deviation signal output $\Delta h_{GS}$ from multiplying circuit 110.

What is claimed is:

1. In an aircraft landing approach system utilizing ILS beam guidance information, a system for computing a signal representative of the altitude deviation of said aircraft from the ILS glide slope centerline comprising:

means for estimating the initial slant range of the aircraft relative to the ILS glide slope transmitter while approaching the glide slope centerline, from ground speed or airspeed, the angular slide slope deviation and sink rate;

means for estimating the actual ground speed from sink rate and linear glide slope deviation;

means for updating the slant range estimate utilizing said estimate of the ground speed;

means for computing the linear deviation from the glide slope centerline from the angular glide slope deviation and the updated slant range estimate, and linear glide slope error feedback means for correcting errors in the range estimation computation.

2. In an aircraft landing approach system utilizing ILS beam guidance information, a system for providing an estimate of the slant range of said aircraft during an approach for landing relative to the ILS glide slope transmitter antenna comprising:

means for providing a signal representative of the angular deviation of said aircraft from said ILS glide slope center line;

means for providing a signal representative of ground speed or air speed of said aircraft;

means for providing a signal representative of the rate of change of altitude of said aircraft; and, means for processing said signal representative of angular deviation of said aircraft from said ILS glide slope center line to provide a signal representative of the rate of change of angular deviation of said aircraft from said ILS glide slope center line;

means for processing said signal representative of the ground speed or air speed of said aircraft and said signal representative of the rate of change of altitude of said aircraft to provide a signal representative of the sum of the gain weighted signal representative of ground speed or air speed and the signal representative of the rate of change of altitude;

means for dividing said signal representative of the sum of the gain weighted signal representative of ground speed or air speed and said signal representative of the rate of change of altitude by said signal representative of the rate of change of angular deviation of said aircraft from said ILS glide slope center line for providing said signal representative of the estimate of the slant range of said aircraft from the ILS glide slope transmitter.

3. The system of claim 2 for providing a signal representative of the estimate of the slant range of said aircraft from the ILS glide slope transmitter further including:

means for storing said signal representative of the slant range at a predetermined initialization point;

means for providing a signal representative of ground speed of said aircraft;

means for integrating said ground speed of said aircraft with respect to time to provide a signal representative of the change in range with respect to time;

means for subtracting from said stored signal representative of the slant range of said aircraft at said predetermined initialization point said signal representative of the change in range with respect to time thereby providing a signal representative of the instantaneous range of said aircraft with respect to the ILS glide slope transmitter.

4. The system of claim 3 further including means for shaping said signal representative of the instantaneous range of said aircraft from said ILS glide slope transmitter as a function of amplitude;

means for multiplying said signal representative of the angular deviation of said aircraft from said ILS glide slope center line by said signal representative of the shaped signal representative of the instantaneous range to provide a signal representative of the altitude deviation of said aircraft from said ILS glide slope center line.

5. The system of claim 4, further including means for providing a signal representative of the steady state rate of change of altitude of said aircraft required for flying on the ILS glide slope center line;

and means responsive to said signal representative of the steady state rate of change of said aircraft required for flying on the ILS glide slope center line for amplifying said signal by a factor $-1/\gamma_{GS}$, where $\gamma_{GS}$ equals the ILS glide slope angle in radians thereby providing a signal representative of the ground speed of said aircraft for coupling to said means for integrating said signal representative of ground speed.

6. The system of claim 5 wherein said means for providing a signal representative of the steady state rate of change of altitude of said aircraft required for flying on the ILS glide slope center line includes:

means for processing said signal representative of the rate of change of altitude of said aircraft to provide a signal representative of the lagged rate of change of altitude of said aircraft;

means for processing said signal representative of the altitude deviation of said aircraft from said ILS glide slope center line for providing a signal representative of the lagged rate of change of said altitude deviation of said aircraft from said ILS glide slope center line, said lagged rate of change of altitude and said rate of change of altitude deviation from the ILS glide slope center line having the same lag time constants; and, means for subtracting from the signal representative of the lagged rate of change of altitude of said aircraft, the signal representative of the lagged rate of change of altitude deviation of said aircraft from said ILS glide slope center line for providing said signal representative of the steady state rate of change of altitude of said aircraft required for flying on the ILS glide slope center line.

7. The system of claim 6 further including filtering means responsive to said signal representative of the steady state rate of change of altitude of said aircraft for flying on the ILS glide slope center line for providing at the output thereof a filtered signal representative of the steady state rate of change of altitude of said aircraft required for flying on the ILS glide slope center line, free from high frequency noise and suitable for coupling to said means for amplifying said signal by a factor $-1/\gamma_{GS}$ for providing said signal representative of ground speed.

8. In an aircraft landing approach system utilizing ILS beam guidance information, a system for providing the rate of change of altitude deviation from the ILS glide slope center line comprising:

means for providing a linear deviation signal representative of the altitude deviation of said aircraft from the ILS glide slope center line;

means for providing a signal representative of the rate of change of altitude of said aircraft;

means responsive to said signal representative of the rate of change of altitude of said aircraft for providing a signal representative of the lagged rate of change of altitude of said aircraft;

means responsive to said signal representative of the altitude deviation of said aircraft from the ILS glide slope center line for providing a signal representative of the lagged rate of change of the altitude deviation of said aircraft from the ILS glide slope center line;

means for subtracting from said signal representative of the lagged rate of change of altitude of said aircraft, said signal representative of the lagged rate of change of the altitude deviation from the ILS glide slope center line for providing a signal representative of the steady state rate of change of altitude of said aircraft required for flying on the ILS glide slope center line;

filtering means responsive to said signal representative of the steady state rate of change of altitude of said aircraft required for flying on the ILS glide slope center line for providing a filtered signal representative of the steady state rate of change of altitude of said aircraft required for flying on the ILS glide slope center line which is substantially free from high frequency noise; and, means for subtracting said filtered signal from said signal representative of the rate of change of altitude of said aircraft to provide a signal representative of the rate of change of altitude deviation of said aircraft from the ILS glide slope center line for further utilization in a glide slope tracking control system.

* * * * *